Feb. 16, 1932.  T. ZERBI  1,845,108
ARRANGEMENT FOR OPERATING RODS
Filed Jan. 4, 1930
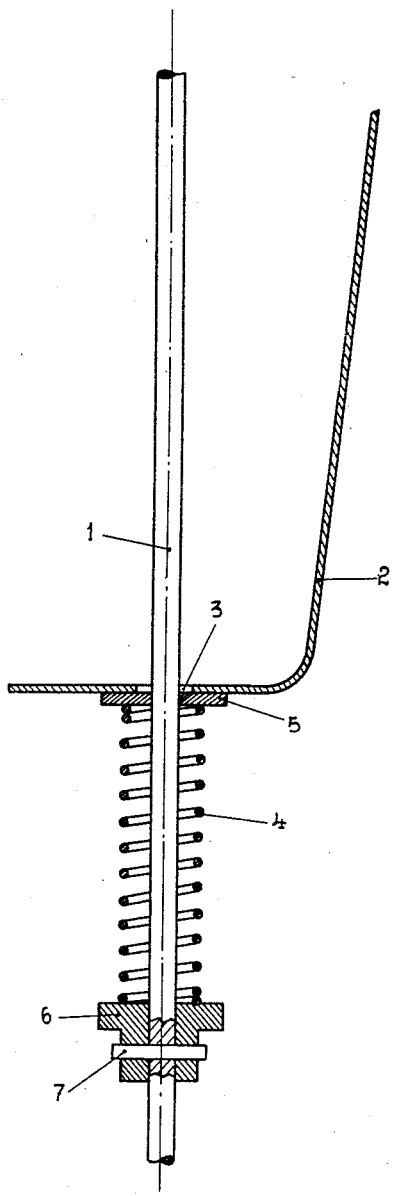

Patented Feb. 16, 1932

1,845,108

UNITED STATES PATENT OFFICE

TRANQUILLO ZERBI, OF TURIN, ITALY, ASSIGNOR TO FIAT SOCIETA ANONIMA, OF TURIN, ITALY

ARRANGEMENT FOR OPERATING RODS

Application filed January 4, 1930, Serial No. 418,620, and in Italy March 30, 1929.

This invention relates to an arrangement to be used in connection with operating rods, more particularly brake tension rods, of motor vehicles at the points where such rods pass from the inside to the outside of the vehicle or through two distinct compartments thereof. By this arrangement it is possible to damp or brake the vibrations or oscillations of the rods caused by the shocks of the running vehicle, and to close the wall traversed by the rod as well as to assist the rod in resuming its normal position when it is no longer acted upon.

The arrangement according to this invention comprises a resilient device constituted by a spring, preferably a helical spring, compressed between two washers of which one is secured to the rod, whilst the other washer is freely mounted on the rod and bears, under the pressure exerted by the spring, on the wall traversed by the rod thus establishing a frictional resistance which is capable of damping or braking the vibrations and oscillations, the said washer closing at the same time the relatively large hole in the wall through which the rod passes.

The helical spring of the device serves also to return the rod to its normal position when it is released.

The accompanying drawing shows by way of example a constructional form of the device according to this invention used in connection with a brake tension rod in the point where said rod traverses the engine mud shield.

1 denotes the rod and 2 the engine mud shield which is provided with a relatively large bore 3 traversed by the rod. The device according to the invention comprises a helical spring 4 compressed between a washer 6 fixed to the rod 1 by the pin 7 passing through the washer and the rod and a washer 5 of suitable material and sufficient diameter, loosely mounted on the rod and resting on the mud shield 2 so as to close the bore 3.

The friction between the washer 5 and the mud shield wall 2, due to the pressure transmitted by the helical spring 4, damps the vibrations of the rod 1; at the same time the washer 5 closes the bore 3 and the spring 4 returns or assists the rod 1 in returning to its normal position when it is released.

What I claim is:

Resilient return means for a rod passing through a hole larger than the rod in a box wall, comprising a spiral spring surrounding the rod, a washer fixed to the rod spaced from the wall and against which one end of said spring bears and a second washer slidably mounted on the rod and pressed by the spring against said wall for closing the hole and for opposing a frictional resistance to the lateral vibrations of the rod, said washer being relatively large in relation to said hole whereby when the rod is at one side of said hole it will entirely close the hole.

In testimony that I claim the foregoing as my invention, I have signed my name.

ING. TRANQUILLO ZERBI.